US010814419B2

(12) United States Patent
Davidson et al.

(10) Patent No.: US 10,814,419 B2
(45) Date of Patent: Oct. 27, 2020

(54) METHOD AND APPARATUS FOR WELDING WITH IMPROVED START

(71) Applicant: Illinois Tool Works Inc., Glenview, IL (US)

(72) Inventors: Robert R. Davidson, New London, WI (US); Todd E. Holverson, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 821 days.

(21) Appl. No.: 15/286,148

(22) Filed: Oct. 5, 2016

(65) Prior Publication Data
US 2018/0093342 A1   Apr. 5, 2018

(51) Int. Cl.
| *B23K 9/12* | (2006.01) |
| *B23K 9/095* | (2006.01) |
| *B23K 9/067* | (2006.01) |
| *B23K 9/173* | (2006.01) |

(52) U.S. Cl.
CPC .............. *B23K 9/125* (2013.01); *B23K 9/067* (2013.01); *B23K 9/0671* (2013.01); *B23K 9/0953* (2013.01); *B23K 9/173* (2013.01)

(58) Field of Classification Search
CPC .... B23K 9/095; B23K 9/0956; B23K 9/0953; B23K 9/1043; B23K 9/1093; B23K 9/173; B23K 9/235; B23K 9/125; B23K 9/067; B23K 9/0671
See application file for complete search history.

(56) References Cited

U.S. PATENT DOCUMENTS

| 8,225,977 B2 * | 7/2012 | Meckler ................ B23K 9/125 226/1 |
| 9,101,999 B2 * | 8/2015 | Lambert ................ B23K 9/124 |
| 9,442,481 B2 | 9/2016 | Davidson et al. |
| 2014/0217077 A1 * | 8/2014 | Davidson ............... B23K 9/173 219/130.33 |

OTHER PUBLICATIONS

International Search Report and the Written Opinion of the International Searching Authority, dated Jan. 31, 2018, European Patent Office 2280 Rijswijk Netherlands.
International Preliminary Report on Patentability dated Apr. 9, 2019 The International Bureau of WIPO 1211Geneva 20 Switzerland.

* cited by examiner

*Primary Examiner* — Brian W Jennison
(74) *Attorney, Agent, or Firm* — George R. Corrigan

(57) ABSTRACT

A method and apparatus for starting a wire fed weld operation includes monitoring at least one of a prior run-in time, a prior run in distance, a prior run in wire feed speed, and/or whether or not there is contact at the time of a prior start. Then the wire position is controlled for a present weld operation in response to the monitored data.

21 Claims, 4 Drawing Sheets

METHOD AND APPARATUS FOR WELDING WITH IMPROVED START

FIELD OF THE INVENTION

The present disclosure relates generally to the art of providing welding type power. More specifically, it relates to starting a welding operation performed with a wire feeder.

BACKGROUND OF THE INVENTION

There are many known types of welding systems used for many different welding processes. Welding-type system, as used herein, includes any device capable of supplying power suitable for welding, plasma cutting, induction heating, CAC-A and/or hot wire welding/preheating (including laser welding and laser cladding), including inverters, converters, choppers, resonant power supplies, quasi-resonant power supplies, etc., as well as control circuitry and other ancillary circuitry associated therewith. Welding type systems typically include a welding type power circuit and a controller to control switches in the power circuit to provide welding type power. Welding-type power circuit, as used herein, refers to power circuitry that receives an input power and provides welding-type power. Welding-type power, as used herein, refers to power suitable for welding, plasma cutting, induction heating, CAC-A and/or hot wire welding/preheating (including laser welding and laser cladding).

Some welding procedures are wire fed processes, such as MIG (Metal Inert Gas or Gas Metal Arc Welding (GMAW), Flux-Cored Arc Welding (FCAW), pulse, short-arc, etc. These processes are performed with a welding type system that includes a wire feeder that feeds a wire to the arc. The wire is melted by the arc as it is fed to the arc. Weld or welding procedure or operation, as used herein, refers to one weld that is performed numerous times on one or more work pieces, such as using a given fixturing and given parts and using a given welding schedule for that weld.

A wire feed weld procedure is started by energizing a contactor that enables power to be provided to the welding power circuit and/or the wire feed motor. Wire is fed (to where the arc will form) until it touches the workpiece. Current begins to flow when the wire touches the workpiece and melts the tip of the wire (or the wire is retracted) until an arc is established. After the welding wire first contacts the piece to be welded the initial arc is small and unstable. If the wire speed is too high during the start the arc can stub out just as it is formed. A slower run in speed helps provide more consistent starts, and some prior art systems provide that the run in speed is less than the user set or programmed wire feed speed. After the arc has stabilized the wire feed speed is increased to the desired wire feed speed. Run in speed, as used herein, refers to the speed or speeds at which the wire advances during the run in time. Run in time, as used herein, refers to the time at the start of a weld when a wire is advancing toward the workpiece before the arc is struck and/or output current is flowing.

Newer welding systems include or work with arc data monitors. The purpose of ADM (arc data monitoring) is to improve quality, reduce cost and improve performance. Performance is usually indicated by the number of parts per hour. In certain applications, the welds are of extremely short duration (less than a second). These types of welds are common in automotive seats and instrument panels. The time between welds in such short-duration welds can be greater than the time welding is being performed.

Welding start data, such as data from the beginning of the weld where the welding wire first contacts the piece to be welded is often acquired. This portion of the process is controlled to generate a quality start with minimal spatter. Slower run in speeds help provide a quality start. However, slower run in speeds also increases the time it takes before the arc is stabilized.

Some welding applications require multiple welds that are of extremely short duration. For example welds used in automotive seats and instrument panels are often less than a second long. Prior art systems, particularly those used for multiple short duration welds, balance the desire for a quality start, which requires a slower run in speed, with the desire to increase productivity by decreasing the run in time with a faster run in speed. Increasing run in speed results in less run in time but can cause the tiny arc to stub out. Reducing the run in speed might give a better start, but the delay times (for the wire to touch the part) reduce productivity. For example, a typical short automation weld might be on the order of 500 to 700 ms. A typical run-in wire feed rate might be 60-100 inches/minute. So a quarter inch of run-in distance would take 150-250 ms for run in speeds of 100-60 ipm, which is significant relative to the weld time (500-700 ms).

Accordingly, a welding system that provides for a reduced starting time yet provides consistent and quality starts is desirable.

SUMMARY OF THE PRESENT INVENTION

According to a first aspect of the disclosure a method of starting a wire fed weld operation includes monitoring at least one of a prior run-in time, a prior run in distance, a prior run in wire feed speed, and/or whether or not there is contact at the time of a prior start, and then controlling a position of the wire for a present weld operation in response to the at least one prior run-in time, run in distance, prior run in wire feed speed, and whether or not there is contact at the beginning of a prior start.

According to a second aspect of the disclosure a method of starting a weld includes monitoring at least one prior time between welds and energizing at least one of a contactor and a wire feed motor in preparation for an anticipated weld in response to the monitoring.

According to a third aspect of the disclosure a welding-type system includes a welding type power circuit, a prior start feedback module, a wire feeder, and a controller. The welding type power circuit has a power control input and a welding type power output. The prior start feedback module has a prior start feedback output and is connected to sense feedback indicative of the welding type output, such as run in data. The wire feeder feeds wire and has a wire feed speed control input and receives the welding type output. The controller has a feedback input connected to the prior start feedback output, and has a power control output connected to the power control input, and has a wire feed speed control output connected to the wire feed speed control input. The controller includes a pre-weld wire positioning module that receives the feedback input and provides the wire feed speed control output prior to a start of the weld.

Controlling the position of the wire includes prepositioning the wire after a previous weld in response to at least the run in distance and/or run in wire feed speed from one or more prior starts of the same weld operation that is being started in one alternative.

The weld operation just completed is a different weld operation than the present weld operation in another alternative.

Controlling the position of the wire includes selecting at least one run-in parameter for the present weld operation in response to the at least one prior run-in data.

Monitoring includes monitoring a plurality of prior run-in times, prior run in distances and prior run in wire feed speeds in various embodiments.

Selecting a run-in parameter includes selecting at least one of a run in time and run in speed in response to an average of the plurality of prior run-in data, and the number of prior data point is such that the average meets a statistically significant threshold in one alternative.

Selecting the run-in parameter includes setting faster and slower of run-in speeds, wherein the slower run in speeds are used after the faster run in speeds, and more of the run in distance is completed at the faster speeds, and contact with the workpiece is made at the slower speeds.

The monitoring is performed for a first weld procedure, which is the same procedure being started, and data is also collected for the start of a second welding procedure, and used to start that second welding procedure in one embodiment.

The at least one prior start is a plurality of prior starts in various embodiments.

The monitoring is performed by an arc data monitoring system in one alternative.

A plurality of prior times between welds is monitored that includes a number of times such that an average of the times between welds meets a statistically significant threshold, and the contactor and/or wire feed motor are deenergized if a weld is not initiated prior to the elapsing of a timeout period in another alternative.

The pre-weld wire positioning module includes memory to store run-in parameters from a plurality of prior run ins in one embodiment.

The pre-weld wire positioning module includes a run in averaging module connected to the memory in various embodiments.

The pre-weld wire positioning module is an adaptive run in module and the prior start feedback module is a prior run in feedback module in one alternative.

The pre-weld wire positioning module is a prepositioning module and the prior start feedback module is a prior run in feedback module in another alternative.

The pre-weld wire positioning module is a prepositioning module and the prior start feedback module is a prior contact feedback module in one embodiment.

Other principal features and advantages of will become apparent to those skilled in the art upon review of the following drawings, the detailed description and the appended claims.

Figure 1:
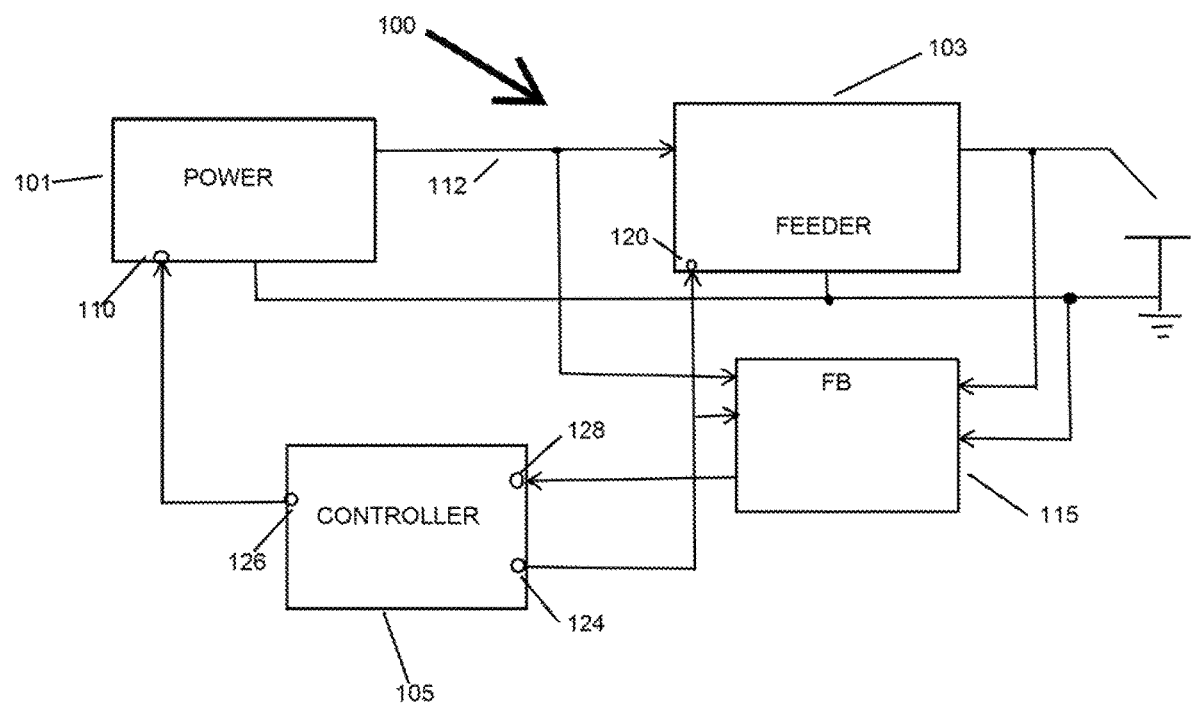
FIG. 1 is a block diagram of welding type system described herein.

Before explaining at least one embodiment in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present disclosure will be illustrated with reference to a particular welding system and a particular starting algorithm, it should be understood at the outset that the invention can also be implemented with other systems and other algorithms. Generally, the invention includes starting a wire fed welding operation such that the run in time is reduced (relative to the prior art). The run in time is reduced by using multiple run in speeds and/or pre-positioning the wire for the next weld so that there is no or very little run in distance.

Various embodiments use multiple run in speeds to reduce the run in time. Preferably, one or more fast run in speeds advance the wire until the wire is close to or touching the workpiece (to reduce the run in time). Then, one or more slower run in speeds are used to finish advancing wire, so that the initial arc will be stable and not likely to be stubbed out. The faster and slower speeds are preferably chosen based on run in data from one or more prior starts. Prior starts are monitored, and prior run in speeds, times or distances are tracked, to allow the run in speeds and times that are selected for the present or current start to reduce the overall run in time, but still provide a slow run in speed as the arc is formed, thus providing a quality start. For example, for a prior art run time of 300 ms at 60 inches per minute the run in distance is 0.3 inches. One embodiment provides a faster run in speed of 240 ipm for 50 ms (covering 0.2 inches) and then a slower run in speed of 60 ipm for 100 msec to advance the wire the last 0.1 inches. Thus, the overall run in time is 150 ms. This allows for the same quality start (at 60 ipm) but done in half of the run in time (150 ms versus 300 ms).

A plurality of prior run-in times, as used herein, refers to more than one of any of run-in times, prior run in distances and prior run in wire feed speed, it can be a plurality of values for one parameter, or it can be a plurality of values for more than one parameter, and/or it can one or more values for a plurality of parameters. Current run-in time refers to the run-in time for the current procedure (not an electrical current). At least one of a prior run-in time, a prior run in distance and a prior run in wire feed speed, refers to at least one value that can be one value for one parameter, or one value for more than one parameter, and/or more than one value for one or more parameters.

Other embodiments pre-position the wire and also provide that the run in time is reduced (relative to the prior art). One embodiment advances the wire to be close to or contacting the workpiece based on prior run in data, and another embodiment advances the wire to be in contact with the workpiece based on the wire contacting or not contacting the workpiece at the beginning of prior starts.

The preposition embodiment that uses prior run in data advances the wire at the end of a given operation to a distance based on prior starts. If history has shown that the run in should be 0.3 inches (300 msec at 60 ipm) then the wire is advanced almost 0.3 inches before the robot is in position to begin the next weld. For example, the wire can be advanced 0.2 inches before the robot is in position, then the remaining run in distance is only 0.1 inches and the run in time at 60 ipm is only 100 ms. Or, the wire could be advanced 0.29 inches before the robot is in position, leaving only 0.01 inches run in distance and 10 msec run in time. The wire could be advanced before the robot is in position so the wire barely touches the workpiece leaving no run in distance. Because the wire is advanced (pre-positioned) at the end of the prior weld or while the robot is moving to the next location, the pre-positioning does not add to the run in time. The pre-positioning can be done at a single, multiple and/or a continuum of speeds, and can be used in combination with multiple run in speeds or with a single run in speed.

The preposition embodiment that uses prior start contact or no contact data advances the wire at the end of a given operation to a distance based on prior starts. If history has shown that advancing the wire 0.3 inches will put the wire in contact with the workpiece then the wire is advanced 0.3 inches before the robot is in position to begin the next weld. One implementation looks at the percentage of starts in contact for a given wire advance. For example, in one embodiment, if a 0.3 inch advance results in contact 90% of the time, then the advance is 0.3 inches. If a 0.3 inch advance results in contact less than 90% of the time, then the wire is prepositioned 0.31 inches (or some other value greater than 0.3 inches) before the next start. Another embodiment also monitors the time spent retracting for a retract start. This helps avoid advancing the wire too far (and causing more time to be spent retracting). One algorithm advances the wire so that there are as many touch starts as possible (100% preferably), but also reduces the advancing if the wire needs to be retracted more than a small amount, to avoid jamming the wire back into the gun if it is advanced too far.

One embodiment with multiple run in speeds provides that the prior run in data is monitored for a plurality of different operations, and that particular run in speeds are calculated for each of the plurality of operations. For example, welding an automotive seats might require eight different welds. Run in data is stored for each of those eight welds, and run in speeds are calculated for each particular one of those eight welds based on the past data for that particular weld. Data is collected, for example, for the third of eight welds. Then that data is used for the future performing of the third weld. The faster run in speeds can be a single speed, a number of discrete speeds, and/or changing speeds. Likewise, the slower run in speeds can be a single speed, a number of discrete speeds, and/or changing speeds. When pre-positioning is based on prior run in data the amount of advancement is determined for the next particular weld based on data collected from prior welds of that particular operation.

The preferred embodiment is implemented with a robotic system, such as a Miller® Miller Auto Continuum. Robotic systems typically have the same location (and stick out) at the start of each weld, and each weld is performed relatively the same as prior welds. The invention is also well suited for manual welding with an experienced operator, who holds a relatively consistent stickout. Robot system are also often used with ADM (arc data monitoring) that can easily associates data with a particular weld. Thus, systems using ADM and performing multiple different welds are well suited for implementing this invention. Arc data monitoring system, as used herein, refers to a system added to or part of a welding system that monitors arc data, and can be external to the welding system.

One embodiment uses an average of data from multiple prior starts to account for variations in the fixturing (holding the part to be welded), or parts variations (dimensions and fit-up). Averaging data smooths out differences due to these variations. The number of data points averaged is preferably chosen in accordance with the consistency of the data. This embodiment is particularly useful when used with ADM of a specific weld on a specific part. A number of data points is preferably used such that a statistically significant threshold is surpassed, or a statistically significant number of data points is used. Statistically significant threshold, as used herein, refers to an average surpassing a given statistical threshold, such having a standard deviation less than a desired amount, or outliers being with a number of standard deviations. Statistically significant number, as used herein, refers to sufficient data points to cross a statistically significant threshold.

A welding-type system 100, shown in FIG. 1 includes a welding type power circuit 101, a wire feeder 103 and a controller 105 cooperate to provide wire and power to a welding arc. Welding type power circuit 101 includes a power control input 110 that receives control signals from controller 105. Welding type power circuit 101 also includes a welding type power output 112 that provides power to wire feeder 103. Alternatives provide that power is provided directly from power circuit 101 to the arc. Wire feeder 103 includes a feed speed control input 120 that receives control signals from controller 105.

A prior start feedback module 115 provides feedback indicative of the welding type output, including whether or not the arc has started. Prior start feedback module 115 can be part of an ADM system. Various alternatives provide that module 115 determines the prior start run in time by monitoring commands or the output voltage. Prior start feedback module, as used herein, refers to a feedback circuit that provides feedback indicative of at least one of a prior run-in time, a prior run in distance, a prior run in wire feed speed, and whether or not there is contact at the time of a prior start. Examples of prior start feedback modules include prior run in feedback modules and prior contact feedback modules. Feedback circuit, as used herein, refers to the circuitry that senses a parameter or parameters and provides a signal responsive to and indicative of the parameter or parameters, including functions thereof, and can include the hardware and software that calculates the functions and/or stores such values and functions.

Controller 105 has a feedback input 124 connected to prior start feedback module 115 to receive feedback of the output (the output power circuit 101 and/or wire feeder 103). Controller 105 also has a power control output 126 connected to the power control input 110 of power circuit 101, and a wire feed speed control output 128 connected to the wire feed speed control input 120 of wire feeder 103. Controller 105 controls wire feeder 103 and power circuit 101 through these connections. The control may be consistent with prior art control, except for the start control described herein.

Figure 2:
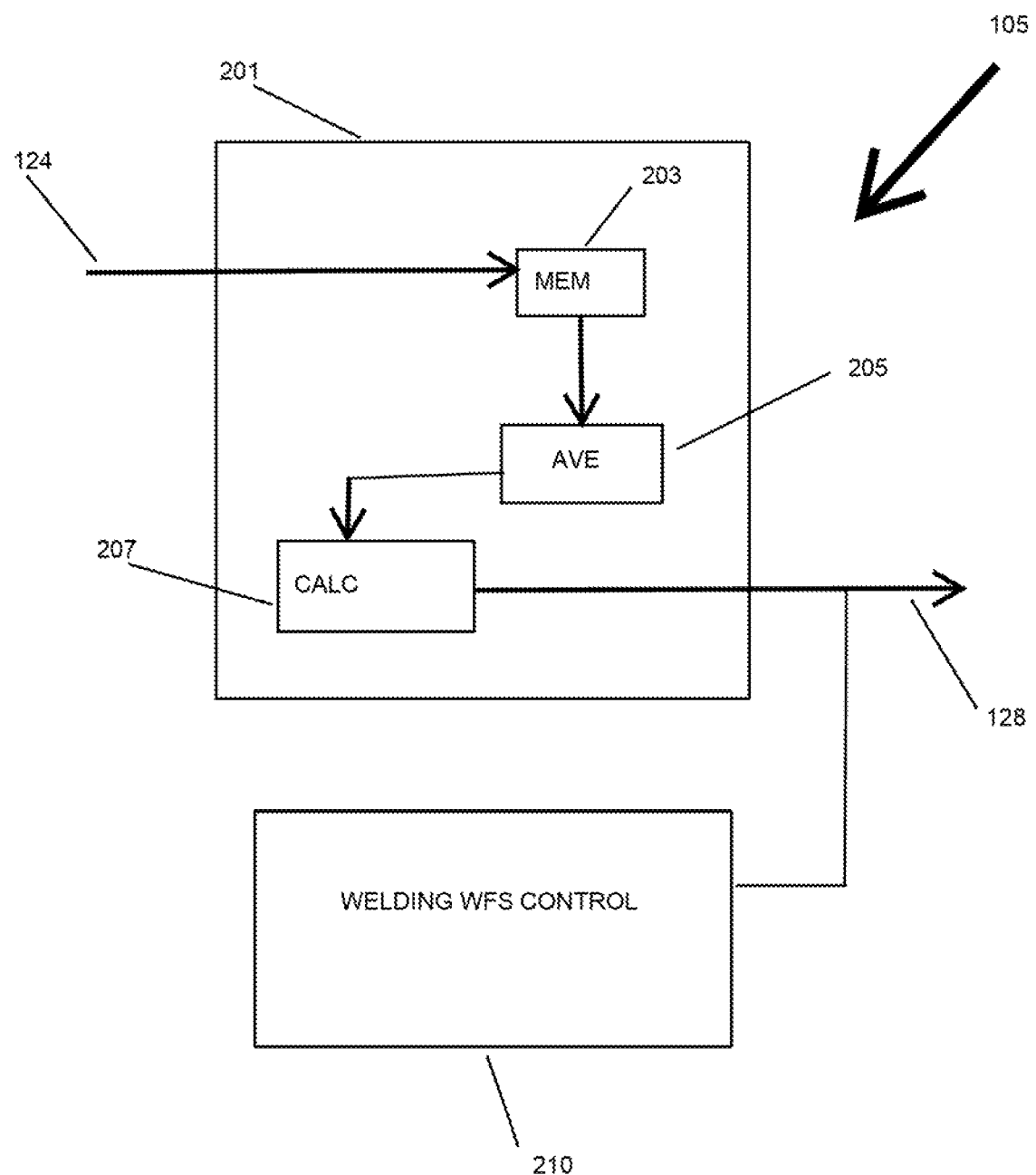
FIG. 2 is a block diagram of a controller used in various embodiments.

Controller 105 is shown in more detail in FIG. 2 and includes (unlike the prior art) pre-weld wire positioning module 201. Pre-weld wire positioning module 201 receives feedback on input 124 and provides wire feed speed commands during a run in time, and/or wire prepositioning commands, on control output 128. Pre-weld wire positioning module, as used herein, is a control module that controls the wire feeder and stick out prior to the start of a weld. Examples of pre-weld wire positioning module include adaptive run in modules and prepositioning modules. Controller, as used herein, includes digital and analog circuitry, discrete or integrated circuitry, microprocessors, DSPs, etc., software, hardware and firmware, located on one or more boards, that form part or all of a controller, and are used to control a welding process, or a device such as a power source or wire feeder. Control module, as used herein, may be digital or analog, and includes hardware or software, that performs a specified control function.

Pre-weld wire positioning module 201 includes memory 203 to store run-in parameters from a plurality of prior run ins received on input 124. Memory 203 is preferably non-volatile digital memory, that stores a statistically significantly number of data points, but can be analog and/or volatile, and/or removable or non-removable. Memory, as used herein, refers to digital or analog memory, and can be volatile or non-volatile. Pre-weld wire positioning module 201 also includes an averaging module 205 connected to memory 203 that averages data in memory 203. Averaging module, as used herein, refers to a module that averages parameters for a plurality of prior starts.

The embodiment with multiple run in speeds is shown in FIG. 2 and pre-weld wire positioning module 201 is an adaptive run in module and prior start feedback module 115 is a prior run in feedback module. In this embodiment adaptive run in module 201 receives feedback on input 124 from prior run in feedback module 115 and provides wire feed speed commands during a run in time, and/or wire prepositioning commands, on control output 128. Adaptive run in module, as used herein, refers to a control module for providing run in speeds that receives run in parameters from at least one prior run-in, (for example times and/or speeds), and calculates a plurality of run in speeds used within a run in, and commands a slower run in speed after a faster run in speed for a welding start. Prior run in feedback module, as used herein, refers to a feedback circuit that provides feedback indicative of at least one of a prior run start time, prior run speed and/or prior run distance.

Control module 210 performs the function of prior art controllers, including commanding the wire feeder while welding, controlling the power circuit, etc.

Figure 3:
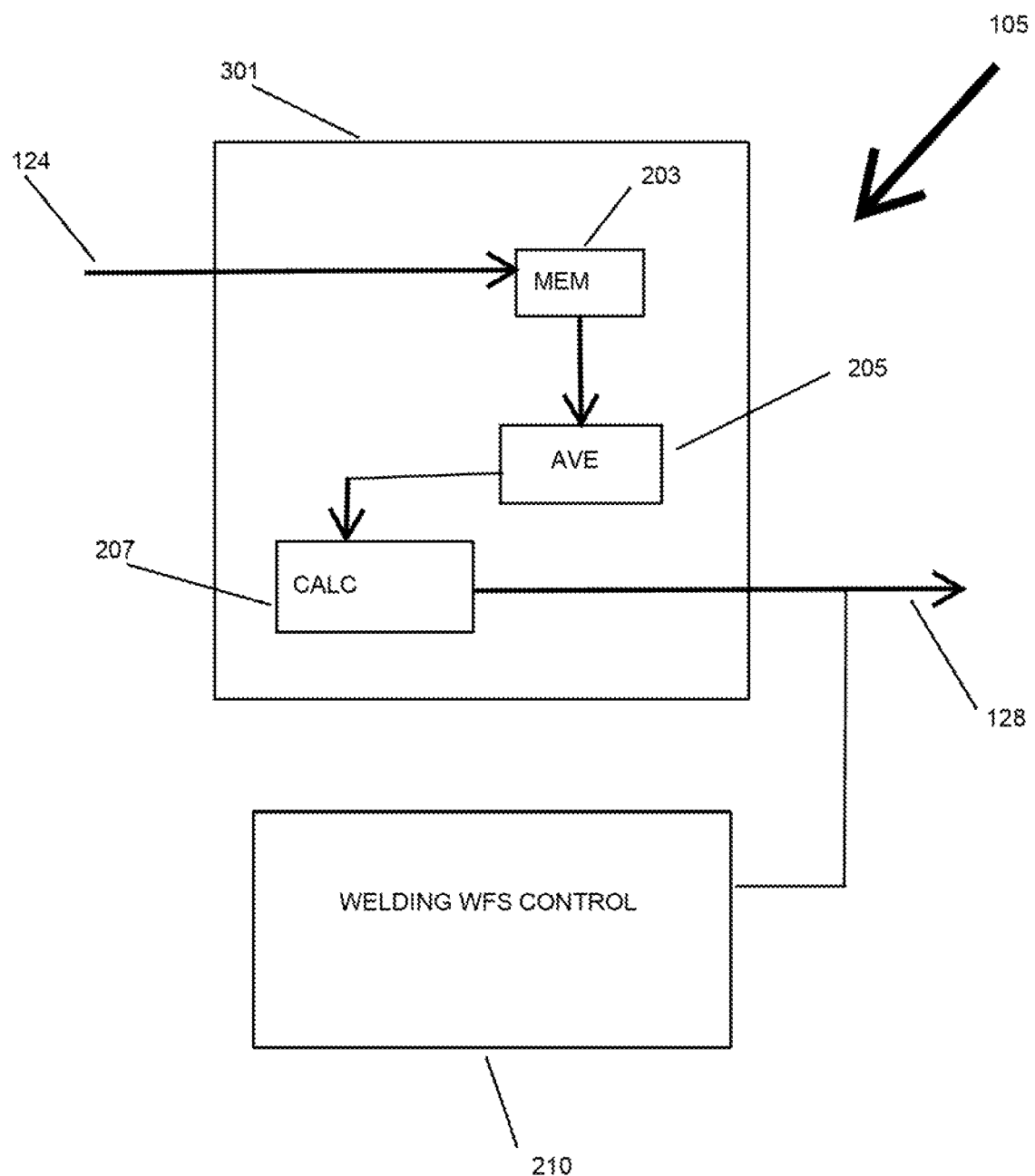
FIG. 3 is a block diagram of a controller used in various embodiments.

The embodiment with prepositioning based on prior run ins is shown in FIG. 3 and pre-weld wire positioning module 201 is implemented with a prepositioning module 301 and uses prior run in feedback module 115 for prior run in data. In this embodiment prepositioning module 301 receives feedback on input 124 from prior run in feedback module 115 and advances the wire at the end of the prior weld or while the robot is moving, so that the wire is touching or nearly touching the work piece prior to the start of the next weld. The amount of the advance can be based on an average of prior run ins. Prepositioning module, as used herein, refers to a control module for moving the wire to be close to or touching the workpiece prior to the start of a weld in response to run in parameters from at least one prior run-in or whether or not the wire contacts the work piece before at least one prior start.

The embodiment with prepositioning based on contact or no contact on prior starts is also shown in FIG. 3, where pre-weld wire positioning module 201 is a prepositioning module. However, prior start feedback module 115 is a prior contact feedback module. In this embodiment pre-weld wire positioning module 301 receives feedback on input 124 from prior starts as to whether or not contact was made prior to that start, Module 301 gives commands to advance the wire at the end of the prior weld or while the robot is moving, so that the wire is likely to be in contact with the work piece prior to the start of the next weld. Prior contact feedback module, as used herein, refers to a feedback circuit that provides feedback indicative of whether or not there is contact at the time of a prior start.

Memory 203 is preferably included in prepositioning module 301 and used for embodiments where prior run in data is needed. Memory 203 (analog, or digital and volatile or non-volatile) preferably stores monitored or collected run-in parameters from a plurality of prior run ins. The size of memory 203 is preferably sufficient to store a statistically significant number of data points. In various embodiments memory 203 stores prior run in data for a plurality of starts for each of a number of different weld operations. An averaging module 205 is connected to memory 203 in one embodiment, and averages prior run in data for each particular welding operations (the memory stores the data and which particular weld operation produced the data). Preferably, memory 203 is a FIFO type memory, where a rolling average of a given number of prior run in data points are stored (for each particular operation). Averaging module 205 can be software and/or hardware.

Adaptive run in module 201 also includes a run in speed calculating module 207 in one embodiment. Speed calculating module 207 receives data from averaging module 205 and calculates a run in time for a fast run in speed (such as 240 ipm) that will bring the wire close to the workpiece (such as within 0.1 inches), and calculates a run in time for the remaining run in distance at a slower run in speed (such as 60 ipm). In some embodiments the faster run in speed, slower run in speed, and the time for the slower run in speed is always the same, so only the faster run in time is calculated (faster run in time=(average run in distance−slower run in time*slower run in speed)/(faster run in speed)).

Run in speed calculating module 207 is a comparison module in one embodiment. If the run in time on the prior operation was greater than a threshold or the average run in time, the speed is increased for the present run in time in accordance with a PI control loop. If the run in time on the prior operation was less than the threshold or average run in time, the speed is decreased for the present run in time in accordance with the PI control loop. The comparison module may be implemented with hardware and/or software. Comparison module, as used herein, refers to a module that compares at least two values, and can be software, hardware or a combination thereof.

One embodiment provides for a method of starting a wire fed weld operation. The method includes monitoring at least one of: a prior run-in time; a prior run in distance; a prior run in wire feed speed; and/or whether or not there is contact at the time of a prior start. In response to the monitoring the position of the wire for a present weld operation is controlled.

The position of the wire for a present weld operation can be controlled by prepositioning the wire for the present weld after the previous weld ends, in response to the monitoring. Preferably, the prior starts that were monitored were the same operation as the present start (so that the data is more meaningful a better preposition may be made). There may be other type of welds between the monitored weld and the present weld. Prepositioning the wire after a prior weld operation, as used herein, refers to advancing the wire to a desired distance prior to the system being in position for the start of the present weld operation.

Prepositioning the wire can include selecting or adjusting one or more run-in parameters for the present weld operation in response to the monitoring, and one or multiple starts can be monitored. Selecting a run-in parameter includes selecting a run in time, speed or distance in various embodiments, The parameter is selected in response to an average of the data monitored (the plurality of prior run-in times, prior run in distances and prior run in wire feed speeds). Preferably the number of data points is such that the average meets a statistically significant threshold.

According to one embodiment, prepositioning the wire includes selecting the run-in time and a plurality of run-in speeds, where a slower run in speed is used after a faster run in speed in the present or current run in. The faster run in speed is used to travel most of the run in distance and the slower run in speed is used when the run-in time ends as the wire contacts the workpiece. Another embodiment provides that the monitoring is performed for two or more weld procedures, and then the run in speeds for each of those procedures is selected based on the monitoring of earlier starts for the same procedure. Thus, each procedure has its own adaptive run in.

Prepositioning the wire can include controlling the position of the wire so that it contacts the workpiece. Preferably this embodiment includes monitoring prior starts for contact or no contact. The wire can be advanced when the prior starts indicate there was not contact, and retracted when the prior starts indicate there was excessive contact.

Figure 4:
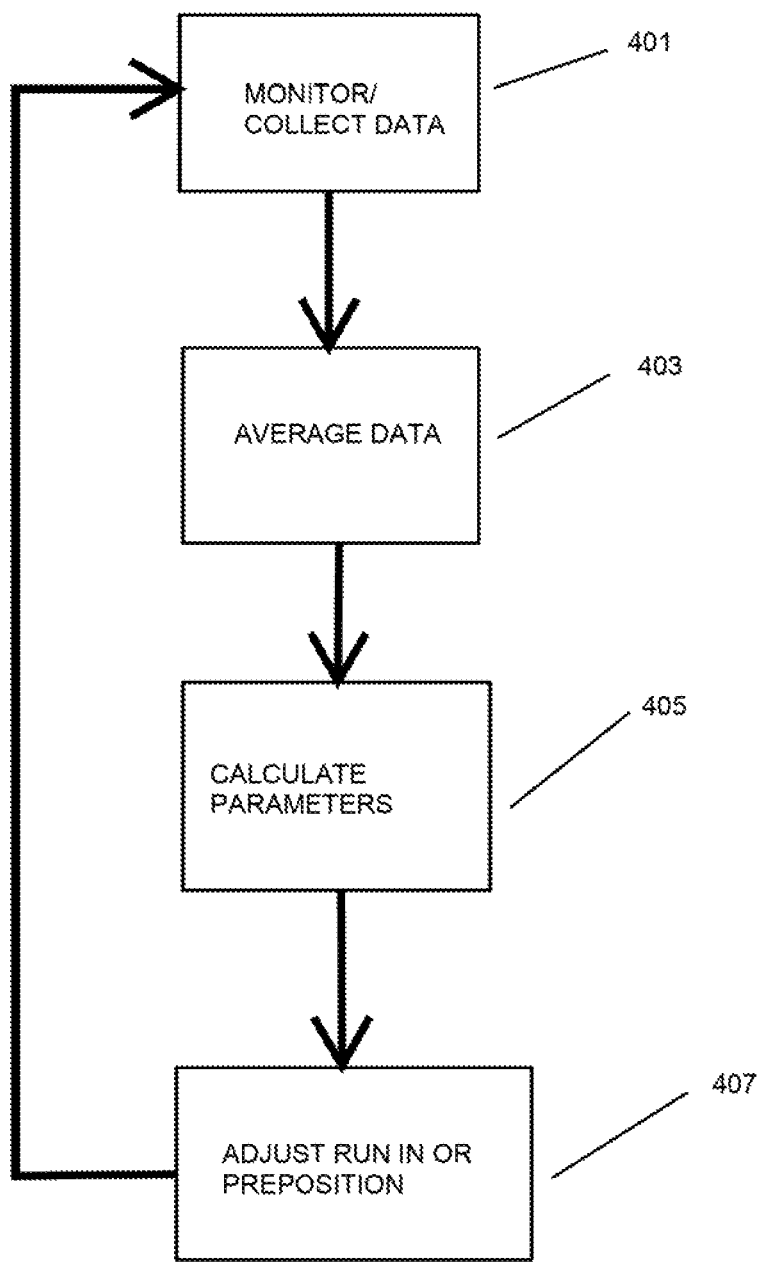
FIG. 4 is a flow chart implementing various embodiments.

FIG. 4 shows an algorithm that implements the methods above. At step 401 start data from a prior weld is monitored/collected. Then, at step 403 that data is averaged with earlier data. Run in parameters or prepositioning parameters are calculated at step 405, using the average. Commands consistent with the calculations are sent to wire feeder 103 at step 407. The start made with the calculated parameters is monitored at step 401 as the process repeats.

Another embodiment provides that the time between welds is monitored and tracked. Then, the contactor and/or wire feed motor is energized before that time expires (after the previous weld ends) in preparation for an anticipated weld in response to the monitoring. Preferably the contactor and the wire feed motor are deenergized if a weld is not initiated prior to the elapsing of a timeout period. Elapsing of a timeout period, as used herein, refers to the passing of a length of time before an expected event (such as an arc initiation) occurs.

Numerous modifications may be made to the present disclosure which still fall within the intended scope hereof. Thus, it should be apparent that there has been provided a method and apparatus for welding and welding starts that fully satisfies the objectives and advantages set forth above. Although the disclosure has been described specific embodiments thereof, it is evident that many alternatives, modifications and variations will be apparent to those skilled in the art. Accordingly, the invention is intended to embrace all such alternatives, modifications and variations that fall within the spirit and broad scope of the appended claims.

The invention claimed is:

1. A method of starting a wire fed weld operation, comprising:
    performing a present weld operation and a first weld procedure before the present weld operation;
    monitoring, for the first weld procedure, at least one of a prior run-in time, a prior run in distance, a prior run in wire feed speed, and whether or not there is contact between the wire and a workpiece at the time of at least one prior start; and
    controlling a position of the wire for the present weld operation in response to the at least one prior run-in time, run in distance, prior run in wire feed speed, and whether or not there is contact between the wire and a workpiece at the beginning of the at least one prior start.

2. The method of claim 1, wherein controlling the position of the wire includes prepositioning the wire after a previous weld in response to the at least one prior run-in time, run in distance and run in wire feed speed, and wherein the at least one of a prior run-in time, a prior run in distance and a prior run in wire feed speed are performed for a prior weld operation, and wherein the prior weld operation is the same weld operation as the present weld operation.

3. The method of claim 2, further comprising an immediately previous weld operation that is a different weld operation than the present weld operation.

4. The method of claim 1, wherein controlling the position of the wire includes selecting at least one run-in parameter for the present weld operation in response to the at least one prior run-in time, run in distance and run in wire feed speed.

5. The method of claim 4, wherein monitoring at least one of the prior run-in time, the prior run in distance and the prior run in wire feed speed, includes monitoring a plurality of prior run-in times, prior run in distances and prior run in wire feed speeds.

6. The method of claim 5, wherein selecting a run-in parameter includes selecting at least one of a run in time and run in speed, and is in response to an average of the plurality of prior run-in times, prior run in distances and prior run in wire feed speeds, and wherein the plurality of prior run-in times, prior run in distances and prior run in wire feed speeds is a plurality of run in times that includes a number of run in times such that the average meets a statistically significant threshold.

7. The method of claim 4, wherein selecting the run-in parameter includes selecting a plurality of run-in speeds, wherein a slower run in speed is used after a faster run in speed in a present run in, and wherein the faster run in speed is used to travel a first run-in distance and the slower run in speed is used to travel a second run-in distance and the first run-in distance is greater than the second run-in distance, and the second run in speed is used when the run-in ends.

8. The method of claim 7, wherein the first weld procedure is performed a plurality of times and the plurality of run-in speeds is used for the first weld procedure performed the plurality of times, further comprising:
    monitoring, before the present weld operation, at least one prior run-in time for a second welding procedure; and
    selecting a second plurality of run-in speeds for a subsequent performing of the second weld procedure.

9. The method of claim 1, wherein the at least one prior start includes a plurality of prior starts, and wherein prepositioning the wire includes advancing or retracting the wire in response to whether or not there is contact between the wire and a workpiece at the time of the plurality of prior starts.

10. The method of claim 1, wherein the monitoring is performed by an arc data monitoring system.

11. A method of starting a weld, comprising:
    monitoring at least one prior time between a plurality of prior welds;
    energizing at least one of a contactor and a wire feed motor in preparation for an anticipated subsequent weld in response to the monitoring wherein the monitoring includes monitoring a plurality of prior times between the plurality of prior welds that includes a number of times between welds such that an average of the times between welds meets a statistically significant threshold, and wherein at least one of the contactor and the wire feed motor are deengerized if a weld is not initiated prior to the elapsing of a timeout period.

12. A welding-type system, comprising:
a welding type power circuit, having a power control input and a welding type power output;
a prior start feedback module having a prior start feedback output and connected to sense feedback indicative of the welding type output;
a wire feeder, having a wire feed speed control input, and disposed to feed wire, that receives the welding type output; and
a controller, having a feedback input connected to the prior start feedback output, and having a power control output connected to the power control input, and having a wire feed speed control output connected to the wire feed speed control input, wherein the controller includes a pre-weld wire positioning module that receives the feedback input and provides the wire feed speed control output prior to a start of the weld.

13. The system of claim 12, wherein the pre-weld wire positioning module includes memory to store run-in parameters from a plurality of prior run ins.

14. The system of claim 13, wherein the pre-weld wire positioning module includes a run in averaging module connected to the memory.

15. The system of claim 13, wherein the pre-weld wire positioning module is an adaptive run in module and the prior start feedback module is a prior run in feedback module.

16. The system of claim 13, wherein the pre-weld wire positioning module is a prepositioning module and the prior start feedback module is a prior run in feedback module.

17. The system of claim 13, wherein the pre-weld wire positioning module is a prepositioning module and the prior start feedback module is a prior contact feedback module.

18. The system of claim 13, further comprising a robot disposed to move the wire to the weld and a robot controller connected to control the robot, wherein the pre-weld wire positioning module is disposed in the robot controller.

19. A welding-type system, comprising:
a welding type power circuit, having power control input and a welding type power output, and feedback means for providing feedback indicative of the welding type output;
a wire feeder, having a wire feed speed control input, and disposed to feed wire that receives the welding type output; and
controller means for controlling the welding type power circuit and the wire feeder in response to the feedback, wherein the controller means includes a feedback input connected to the feedback means, and a power control output connected to the power control input, and a wire feed speed control output connected to the wire feed speed control input, and wherein the controller includes means for providing the wire feed speed control output during a run in time in response to the feedback, wherein the feedback is indicative of at least one of a prior run-in time, a prior run in distance and a prior run in wire feed speed.

20. The system of claim 19, wherein the means for providing the wire feed speed control output during a run in time in response to the feedback includes a means for providing a wire feed speed command that is responsive to a plurality of prior run-in times, prior run in distances and prior run in wire feed speeds.

21. The system of claim 19, further comprising a robot disposed to move the wire to the weld and a robot controller connected to control the robot, wherein the means for providing the wire feed speed control output during a run in time is disposed in the robot controller.

* * * * *